US012332338B1

(12) United States Patent
Huang et al.

(10) Patent No.: US 12,332,338 B1
(45) Date of Patent: Jun. 17, 2025

(54) ONE-BIT QUANTIZATION BASED TARGET TRACKING METHOD, DEVICE, TERMINAL, AND STORAGE MEDIUM

(71) Applicant: SHENZHEN UNIVERSITY, Guangdong (CN)

(72) Inventors: Lei Huang, Shenzhen (CN); Tianyao Long, Shenzhen (CN); Wei Wang, Shenzhen (CN); Yuhang Xiao, Shenzhen (CN); Xian Fan, Shenzhen (CN); Jinhui Chen, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 19/049,237

(22) Filed: Feb. 10, 2025

(30) Foreign Application Priority Data

Oct. 29, 2024 (CN) .......................... 202411517557.2

(51) Int. Cl.
*G01S 13/66* (2006.01)
*G01S 7/292* (2006.01)
*G01S 13/10* (2006.01)

(52) U.S. Cl.
CPC .............. *G01S 13/66* (2013.01); *G01S 7/292* (2013.01); *G01S 13/103* (2013.01)

(58) Field of Classification Search
CPC .......... G01S 7/292; G01S 13/66–13/74; G01S 13/103
See application file for complete search history.

(56) References Cited

U.S. PATENT DOCUMENTS

| 3,786,504 A * | 1/1974 | Collins ................. G01S 7/2923 |
| | | 342/197 |
| 10,979,066 B1 * | 4/2021 | Huang ................. H03M 1/468 |
| 2016/0373125 A1 * | 12/2016 | Pagnanelli ............ H03M 3/436 |
| 2020/0132741 A1 * | 4/2020 | Nishimura ............ G01R 23/16 |
| 2021/0033729 A1 * | 2/2021 | Alalusi ................. G01S 17/93 |

(Continued)

OTHER PUBLICATIONS

Chen et al. "Performance Analysis of One-Bit Digital Beamforming", IEEE Transactions on Aerospace and Electronic Systems, vol. 59, Issue 6, Dec. 2023, pp. 8235-8245 (Year: 2023).*

*Primary Examiner* — Peter M Bythrow
(74) *Attorney, Agent, or Firm* — Maier & Maier, PLLC

(57) ABSTRACT

A one-bit quantization based target tracking method, device, terminal, and storage medium. The method includes acquiring echo data of each radar node in a multi-radar node system for a target; performing one-bit quantization on each echo data to obtain one-bit data; estimating a distance information and a direction of arrival of signal of the target relative to each radar node based on the one-bit data; determining, based on the distance information and the direction of arrival of signal, a position information of the target relative to each radar node; fussing the position information to obtain a tracking point of the target. By adopting one-bit quantization and multi-base site trajectory fusion processing, high-precision detection and tracking of ocean monitoring targets are achieved, which significantly enhances data processing speed and anti-interference capability, while reducing the demand for storage and transmission resources, ensuring reliability and real-time performance in complex environments.

9 Claims, 7 Drawing Sheets

(56) References Cited

U.S. PATENT DOCUMENTS

| | | | |
|---|---|---|---|
| 2022/0278755 A1* | 9/2022 | Lee ........................ | H04L 27/233 |
| 2022/0376954 A1* | 11/2022 | Lee ........................ | H04B 7/084 |
| 2023/0236278 A1* | 7/2023 | Lee ........................... | G01S 3/04 |
| | | | 455/456.1 |

* cited by examiner

ONE-BIT QUANTIZATION BASED TARGET TRACKING METHOD, DEVICE, TERMINAL, AND STORAGE MEDIUM

CROSS-REFERENCE TO RELATED APPLICATIONS

The present disclosure claims priority to Chinese Patent Application No. 202411517557.2, filed on Oct. 29, 2024, the content of all of which is incorporated herein by reference.

FIELD

The present disclosure relates to the field of radar signal processing technology, and in particular to a one-bit quantization based target tracking method, device, terminal, and storage medium.

BACKGROUND

In modern maritime detection and coastal inspection fields, ships are the primary targets for detection, and their precise localization and tracking are critical for maritime traffic safety, coastal defense monitoring, and marine resource management. Currently, single-radar-node systems are commonly used for target detection and tracking in these fields. However, existing single-radar-node systems face challenges such as insufficient resolution and limited data processing capabilities when dealing with complex maritime environments and multi-target scenarios, making it difficult to meet the requirements for high precision and real-time performance. Additionally, traditional radar systems typically require significant storage and transmission bandwidth to process high-bit-rate signal data, limiting their application in resource-constrained environments. This makes it challenging to achieve accurate point cloud imaging and continuous trajectory tracking of targets like ships. Particularly in adverse weather conditions and low-visibility scenarios, the reliability and accuracy of single-radar-node systems significantly degrade.

Therefore, the prior art still needs to be developed.

SUMMARY

The technical problem to be solved by the present disclosure is to provide a one-bit quantization based target tracking method, device, terminal and storage medium in view of the deficiencies in the prior art.

In order to solve the above-mentioned problems, a first aspect of the present disclosure provides a one-bit quantization based target tracking method, which includes:

Acquiring echo data of each radar node in a multi-radar node system for a target;

Performing one-bit quantization on each echo data separately to obtain one-bit data of each radar node;

Estimating a distance information of the target relative to each radar node based on the one-bit data of each radar node, and estimating a direction of arrival of signal corresponding to each radar node based on the one-bit data of each radar node;

Determining, based on the distance information of the target relative to each radar node and the direction of arrival of signal corresponding to each radar node, a position information of the target relative to each radar node;

Fussing the position information of the target relative to each radar node to obtain a tracking point of the target, and forming a tracking trajectory of the target based on the tracking point.

In the one-bit quantization based target tracking method, the each radar node in the multi-radar node system are arranged at intervals, and two adjacent radar nodes are separated in geographical locations.

In the one-bit quantization based target tracking method, the one-bit quantization is:

$$S_{one}(t) = \frac{1}{\sqrt{2}}[\text{sign}(\text{real}\{S_{IF}(t)\}) + j \cdot \text{sign}(\text{imag}\{S_{IF}(t)\})]$$

$$S_{IF}(t) = A_0 \exp\{i2\pi f_a t + \varphi_1\}$$

$$\text{sign}(g) = \begin{cases} 1, & \geq 0 \\ -1, & < 0 \end{cases}$$

$$f_a = \frac{2R\kappa}{c} + \frac{2v}{\lambda} = f_R + f_D$$

$\kappa = B/T$
$\lambda = 1/f_c$ $$\phi_1 = \frac{4\pi R}{\lambda} \text{mod}(2\pi)$$

where $s_{one}(t)$ represents one-bit data, $s_{IF}(t)$ represents echo data, real{g} represents real part of a complex number, imag{g} represents imaginary part of a complex number, sign(·) represents sign-taking operation, $A_0$ represents signal amplitude, $\varphi_1$ represents phase of the echo data, $f_a$ represents frequency of the echo data, t represents time domain sampling, $i=\sqrt{-1}$, κ represents frequency modulation slope, B represents signal frequency modulation bandwidth, T represents signal frequency modulation period, c represents speed of light, $f_c$ represents carrier frequency, λ represents carrier wavelength, mod(·) represents integer-taking operation, R represents distance information, v represents speed information, $f_D$ represents speed frequency, and $f_R$ represents distance frequency.

In the one-bit quantization based target tracking method, the estimating a distance information of the target relative to each radar node based on the one-bit data of each radar node includes:

Performing T-point fast Fourier transform in a fast time dimension of the one-bit data of each radar node to obtain a distance frequency;

Calculating the distance information of the target relative to each radar node based on the distance frequency.

In the one-bit quantization based target tracking method, the fussing the position information of the target relative to each radar node to obtain a tracking point of the target includes:

Selecting, in the multi-radar node system, a radar node as a target radar node, and adopting a coordinate system of the selected target radar node as a target coordinate system;

Converting the position information of the target relative to other radar nodes into the target coordinate system to obtain a converted position information of the target relative to other radar nodes;

Fussing the position information of the target relative to the target radar node and the converted position information of the target relative to other radar nodes to obtain the tracking point of the target.

In the one-bit quantization based target tracking method, at least one radar node in the multi-radar node system is equipped with a coprime array, and the coprime array includes a first subarray, a second subarray and a third subarray arranged in sequence on a straight line; the first subarray includes N array elements, and has array element intervals of Ld; the second subarray includes $$M^* = \left\lfloor \frac{LN}{M} \right\rfloor + 1$$

array elements, and has array element intervals of Md; the third subarray includes L array elements, and has array element intervals of Nd. The first subarray overlaps with adjacent array elements of the second subarray, and the second subarray overlaps with adjacent array elements of the third subarray, while N, M and L are mutually prime.

The one-bit quantization based target tracking method further includes:

Performing P-point fast Fourier transform in a slow time dimension of the one-bit data of each radar node to obtain a velocity frequency;

Calculating a speed information of the target relative to each radar node based on the speed frequency;

Fussing the speed information of each radar node to obtain speed information corresponding to the tracking point, and recording the speed information on the tracking point.

A second aspect of the present disclosure provides a one-bit quantization based target tracking device, the device includes:

An acquisition module, used to acquire echo data of each radar node in a multi-radar node system for a target;

A quantization module, used to perform one-bit quantization on each echo data separately to obtain one-bit data of each radar node;

An estimation module, used to estimate a distance information of the target relative to each radar node based on the one-bit data of each radar node, and estimate a direction of arrival of signal corresponding to each radar node based on the one-bit data of each radar node;

A determination module, used to determine, based on the distance information of the target relative to each radar node and the direction of arrival of signal corresponding to each radar node, a position information of the target relative to each radar node;

A fusion module, used to fuss the position information of the target relative to each radar node to obtain a tracking point of the target, and form a tracking trajectory of the target based on the tracking point.

A third aspect of the present disclosure provides a computer-readable storage medium, which stores one or more programs, and the one or more programs can be executed by one or more processors to implement the steps in any of the above-mentioned one-bit quantization based target tracking method.

A fourth aspect of the present disclosure provides a terminal, which includes a processor and a memory.

The memory stores a computer-readable program executable by the processor;

when the processor executes the computer-readable program, the steps in any of the above-described one-bit quantization based target tracking method are implemented.

Beneficial Effects

1. The present disclosure simplifies the radar echo signal into one-bit data through one-bit quantization, which can significantly reduce the amount of data while maintaining the accuracy of signal processing. Therefore, the demand for storage and transmission of data is reduced, the data processing speed is improved, and real-time monitoring and processing is possible.

2. The present disclosure quantizes the radar echo signal through one-bit quantization, which also improves the anti-interference ability of the system, making the radar system more stable and reliable in complex marine environments.

3. The present disclosure uses a multi-radar node system to track the target, and fusses the position information and direction of arrival of signal determined by each radar node to determine the tracking point of the target. Therefore, more accurate target point cloud images and track information can be generated. This not only enhances the detection accuracy and tracking stability of the target, especially in complex or dynamically changing environments, but also enhances the redundancy and robustness of the system, and maintains the continuity and accuracy of monitoring even when some nodes fail.

BRIEF DESCRIPTION OF THE DRAWINGS

In order to more clearly illustrate the technical solutions in the embodiments of the present disclosure, the drawings required for use in the description of the embodiments are briefly introduced below. Obviously, the drawings described below are only some embodiments of the present disclosure. For ordinary technicians in this field, other drawings can be obtained based on these drawings without creative work.

DETAILED DESCRIPTION OF EMBODIMENTS

The embodiments of the present disclosure provide a one-bit quantization based target tracking method, device, terminal and storage medium. In order to make the purpose, technical solution and effect of the present disclosure clearer, the present disclosure is further described in detail with reference to the accompanying drawings and examples. It should be understood that the embodiments described herein are only used to explain the present disclosure and are not used to limit the present disclosure.

It should be understood by those skilled in the art that, unless expressly stated, the singular forms "a", "an", and "the" used herein may also include plural forms. It should be further understood that the term "comprising" or "including" used in the specification of the present disclosure refers to the presence of the features, integers, steps, operations, elements and/or components, but does not exclude the presence or addition of one or more other features, integers, steps, operations, elements, components and/or groups thereof. It should be understood that when we refer to an element as being "connected" or "coupled" to another element, it may be directly connected or coupled to the other element, or there may be an intermediate element. In addition, the "connecting" or "coupling" used herein may include wireless connection or wireless coupling. The term "and/or" used herein includes all or any unit and all combinations of one or more associated listed items.

It should be understood by those skilled in the art that, unless otherwise defined, all terms (including technical and scientific terms) used herein have the same meaning as those generally understood by those skilled in the art to which the present disclosure belongs. It should also be understood that terms such as those defined in general dictionaries should be understood to have meanings consistent with those in the context of the prior art, and will not be interpreted with idealized or overly formal meanings unless specifically defined as here.

It should be understood that the sequence numbers and sizes of the steps in the present embodiment do not mean the order of execution. The execution order of each process is determined by its function and internal logic, and should not constitute any limitation on the implementation process of the embodiment of the present disclosure.

The content is further explained below through the description of embodiments in conjunction with the accompanying drawings.

Figure 1:
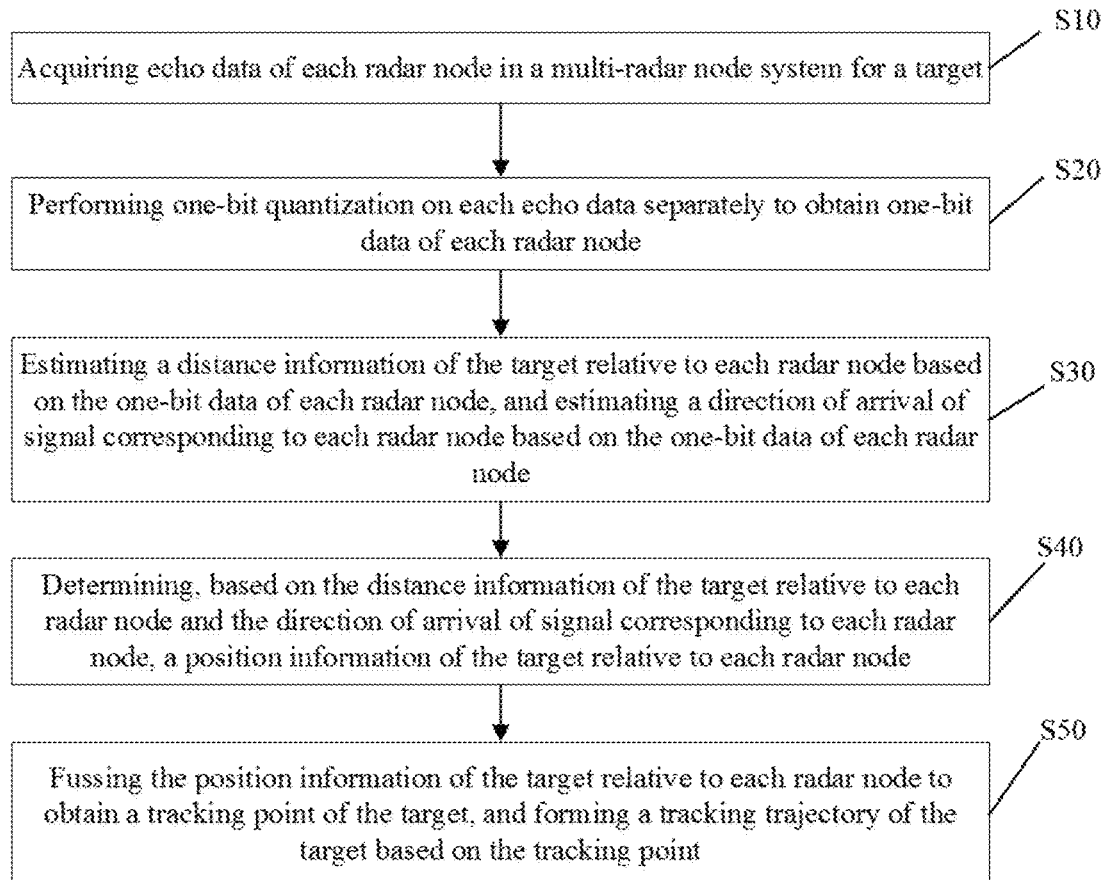
FIG. 1 is a flow chart of a one-bit quantization based target tracking method according to an embodiment of the present disclosure.

The present embodiment provides a one-bit quantization based target tracking method, as shown in FIG. 1, the method includes:

S10. Acquiring echo data of each radar node in a multi-radar node system for a target.

The multi-radar node system includes at least two radar nodes, and the at least two radar nodes are deployed at different locations (such as along the coastline, etc.), that is, at least two radar nodes are arranged at intervals, and two adjacent radar nodes are separated in geographical location. In addition, the radar nodes in the multi-radar node system work together to obtain more comprehensive detection coverage, thereby improving the detection range and angular resolution of targets (such as ship targets, etc.).

Each radar node will periodically transmit a Chirp signal with a Pulse Repetition Interval (PRI). The Chirp signal is a Frequency-Modulated Continuous Wave (FMCW), which is a complex sinusoidal signal whose frequency increases linearly with time:

$$S_t(t) = A_0 \exp\left\{i2\pi\left[f_c + \left(\frac{B}{2T}\right)t\right]t + \varphi_0\right\}$$
$$= A_0 \exp\{i2\pi f_c t + \pi \kappa t^2 + \varphi_0\}$$

κ=B/T where $s_t(t)$ represents a complex sinusoidal signal, $f_c$ represents carrier frequency, $A_0$ represents signal amplitude, $\varphi_0$ represents initial phase, B represents signal frequency modulation bandwidth, T represents frequency modulation period, κ represents frequency modulation slope, t represents time domain sampling, $i=\sqrt{-1}$ represents the imaginary unit.

Each radar node receives an echo signal with corresponding delay and certain attenuation reflected by the target. For a target a with radial distance R and speed v, the echo signal is:

$$s_r(t) = A_0 \exp\{i2\pi f_c(t-t_a) + \pi \kappa(t-t_a)^2 + \varphi_0\}$$

$$\tau_a = (2(R+vt))/c$$

where $s_r(t)$ represents the echo signal, c represents speed of light, and $\tau_a$ represents intermediate variable.

Further, after the echo signal is acquired, the received echo signal is mixed to obtain an intermediate frequency signal to obtain echo data, wherein the echo data can be expressed as:

$$s_{IF}(t) = A_0 \exp\{i2\pi f_a t + \varphi_1\}$$

$$f_a = \frac{2R\kappa}{c} + \frac{2v}{\lambda} = f_R + f_D$$

$$\phi_1 = \frac{4\pi R}{\lambda} \mod (2\pi)$$

κ=B/T
λ=1/$f_c$ where $A_0$ represents signal amplitude, $\varphi_1$ represents phase of the echo data, represents the frequency of the echo data, represents the time domain sampling, $f_a$ represents frequency of the echo data, t represents time domain sampling, $i=\sqrt{-1}$, κ represents frequency modulation slope, B represents signal frequency modulation bandwidth, T represents the signal frequency modulation period, c represents speed of light, $f_c$ represents carrier frequency, λ represents carrier wavelength, mod(·) represents integer-taking operation, R represents distance information, v represents speed information, $f_D$ represents speed frequency, and $f_R$ represents distance frequency.

Figure 2:
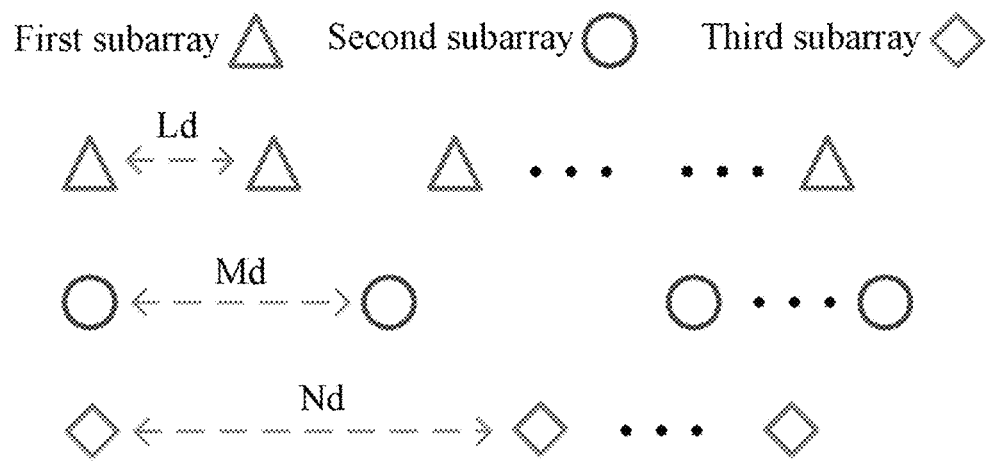
FIG. 2 is a schematic diagram of a coprime matrix according to an embodiment of the present disclosure.
Figure 3:
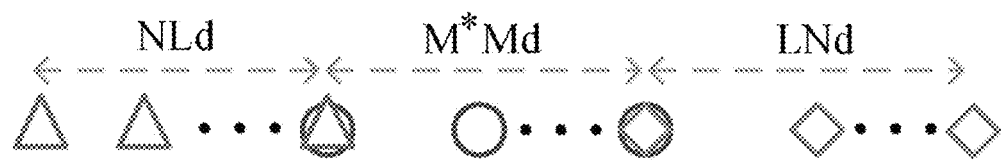
FIG. 3 is a flow chart of a direction of arrival of signal estimation method according to an embodiment of the present disclosure.

In one implementation, there is at least one radar node in the multi-radar node system equipped with a coprime array. As shown in FIG. 2 and FIG. 3, the first subarray is represented by "Δ", the second subarray is represented by "○", and the third subarray is represented by "◇". The first subarray includes N array elements, and has array element intervals of Ld; the second subarray includes $$M^* = \left\lfloor \frac{LN}{M} \right\rfloor + 1$$

array elements, and has array element intervals of Md; the third subarray includes L array elements, and has array element intervals of Nd, while N, M and L are mutually prime. Among them, the first subarray, the second subarray and the third subarray are located on a straight line; the second subarray is located after the first subarray, and the last array element of the first subarray overlaps with the starting array element of the second subarray, that is, the first subarray overlaps with the adjacent array elements of the second subarray; the third subarray is located after the second subarray, and the last array element of the second subarray overlaps with the starting array element of the third subarray, that is, the second subarray overlaps with the adjacent array elements of the third subarray.

In an embodiment of the present disclosure, three subarrays are connected end to end to form a triple extended coprime array to strengthen the coprime constraints between the subarrays, so that the probability of overlapping fuzzy angle sets is greatly reduced, and thus directional ambiguity can be effectively avoided when estimating the directions of multiple signal sources, thereby improving the DoA (direction of arrival) estimation performance, thereby improving the target detection and positioning accuracy of the millimeter wave radar system under single snapshot conditions.

Furthermore, the aperture of the first subarray is close to the spatial aperture of the third subarray, and the aperture of the second subarray is close to the aperture of the first subarray (for example, the difference between the aperture of the second subarray and the aperture of the first subarray is within a preset range). Thus, relative to an array with two subarrays, the additional third subarray does not increase the risk of DoA estimation ambiguity leakage, and the probability of overlap of ambiguity angles of the three subarrays is lower than that of a traditional coprime array with only two subarrays, thereby greatly reducing the probability of overlap of ambiguity angle sets.

As shown in FIG. 2, the array element positions of the coprime array are:

$$\mathbb{P} = \{nLd|0 \leq n \leq N\} \cup \{\{\overline{N}+mMd\}|0 \leq m \leq M^*\} \cup \{\{\overline{M}+lNd\}|0 \leq l \leq L\} = \{p_0, p_1, \ldots, p_{w-1}\}$$

$$\overline{N} = (N-1)Ld$$

$$\overline{M} = \overline{N} + (M-1)Md$$

where $W = N+M^*+L-2$ represents total number of array elements; P represents coprime array, $p_i$ represents the array element at the i-th array element position in P, $\overline{N}$ represents the starting array element position the second subarray, and $\overline{M}$ represents the starting array element position of the third subarray.

In addition, for the coprime array provided in the embodiment of the present disclosure, when there are K far-field incoherent signal sources reaching the array from different angles $\theta_1, \theta_2, \ldots, \theta_K$, the single-snapshot array receiving signal is modeled as:

$$y = A_\mathbb{P} x + n$$

where y represents the array received signal of the coprime array, $A_p = [a(\theta_1), a(\theta_2), \ldots, a(\theta_K)]$ represents the array manifold matrix of the coprime line series P, $a(\theta_k) = [1, e^{j2\pi p_1 \sin(\theta_k)/\lambda}, \ldots, e^{j2\pi p_{w-1} \sin(\theta_k)/\lambda}]$ represents the steering vector of the k-th source, $\lambda$ is the wavelength; $x = [x_1, x_2, \ldots, x_K]$ represents the signal amplitude, n represents the Gaussian white noise vector, $p_i$ represents the array element spacing between the i-th array element and the starting array element, $i = 1, 2, \ldots, W-1$. Therefore, the sample covariance matrix of T snapshot array received signal can be expressed as:

$$\hat{R} = yy^H = \left(\sum_{k=1}^{K} y_{\theta_k} + n\right)\left(\sum_{k=1}^{K} y_{\theta_k} + n\right)^H$$

$$= \sum_{k=1}^{K} y_{\theta_k} y_{\theta_k}^H + \left[\sum_{\substack{k=1 \\ r \neq k}}^{K}\sum_{r=1}^{K} y_{\theta_k} y_{\theta_r}^H + \sum_{k=1}^{K}\left(y_{\theta_k} n^H + n y_{\theta_k}^H\right)\right] + nn^H$$

$$= \hat{R}_s + \hat{R}_c + \hat{R}_n$$

$$\hat{R}_s = \sum_{k=1}^{K} y_{\theta_k} y_{\theta_k}^H$$

$$\hat{R}_c = \left[\sum_{\substack{k=1 \\ r \neq k}}^{K}\sum_{r=1}^{K} y_{\theta_k} y_{\theta_r}^H + \sum_{k=1}^{K}\left(y_{\theta_k} n^H + n y_{\theta_k}^H\right)\right]$$

$$\hat{R}_n = nn^H$$

where y represents the array received signal of the coprime array, $y^H$ represents the conjugate of y, $n^H$ represents the conjugate of n, $\hat{R}_s$ represents the signal autocorrelation matrix; $\hat{R}_c$ represents the sum of the cross-correlation matrix between different signals and the signal-noise cross-correlation matrix; $\hat{R}_n$ represents the noise autocorrelation matrix, $y_{\theta_k}$ represents the received signal of the k-th source, and $y_{\theta_k}^H$ represents the conjugate of $y_{\theta_k}$.

In addition, in the coprime array provided in the embodiment of the present disclosure, since the three sub-arrays of the triple extended coprime array are mutually prime, the fuzzy angles of the same angle in any two of the three sub-arrays do not overlap. Therefore, for any angle $\theta_k$, the fuzzy angle sets $\mathbb{A}_{\theta_k}^{(i)}$ and $\mathbb{A}_{\theta_k}^{(j)}$ of the subarray i and the subarray j will not overlap, that is:

$$\forall i,j \in \{1,2,3\}, \forall k \in \{1,2,\ldots,K\}$$

$$\mathbb{A}_{\theta_k}^{(i)} \cap \mathbb{A}_{\theta_k}^{(j)} = \emptyset$$

In addition, since the fuzzy positions of the angles on the sparse uniform linear array are uniformly distributed in the frequency domain, for any angle $\theta_k$, if the fuzzy angle set of $\theta_k$ in the i-th subarray and the fuzzy angle set of $\theta_r$ in the j-th subarray have two overlapping fuzzy angle $\theta_1$ and $\theta_2$, then for $\theta_1$, there is a common fuzzy angle $\theta_2$ in the two subarrays, and for any angle $\theta_k$, the fuzzy angle set $\mathbb{A}_{\theta_k}^{(i)}$ and $\mathbb{A}_{\theta_k}^{(j)}$ of the subarrays i and subarrays j do not overlap with each other. Therefore, for any two directions, the fuzzy angle sets generated by different subarrays have at most one overlapping angle, that is:

$$\forall i,j \in \{1,2,3\}, i \neq j, \forall k,r \in \{1,2,\ldots,K\}$$

$$|\mathbb{A}_{\theta_k}^{(i)} \cap \mathbb{A}_{\theta_r}^{(j)}| > 2$$

Furthermore, if two directions have overlapping blur angles in two sub-arrays, then the overlapping angles will not overlap with the blur angles in the remaining sub-arrays:

$$\forall i,j \in \{1,2,3\}, \forall k,r \in \{1,2,\ldots,K\}, k \neq r,$$

$$\mathbb{A}_{\theta_k}^{(i)} \cap \mathbb{A}_{\theta_r}^{(j)} \neq \emptyset \Rightarrow \mathbb{A}_{\theta_k}^{(i)} \cap \mathbb{A}_{\theta_r}^{(\tilde{j})} = \emptyset$$

where $\tilde{j} \in \{1,2,3\} \setminus \{j\}$.

Therefore, the probability of overlapping fuzzy angle sets between multiple subarrays is greatly reduced in the triple extended coprime array composed of three groups of coprime subarrays compared to the coprime array composed of only two subarrays. This enables the triple extended coprime array to effectively avoid directional ambiguity when estimating the directions of multiple signal sources, thereby showing higher direction estimation accuracy in practical applications.

The coprime array mentioned in the embodiment of the present disclosure is based on a single snapshot signal to directly perform DoA processing, and does not rely on other sparse arrays based on multi-snap virtual array elements. Therefore, the coprime array directly processes the physical array elements, and the data dimension is smaller than the method of the virtual array element; and the coprime array can be directly used for single snapshot DoA estimation, which is more in line with the requirements of actual engineering (the on-board point cloud imaging processes a single snapshot high signal-to-noise ratio signal after two-dimensional compression).

In addition, it should be noted that each radar node in the multi-radar node system in the embodiment of the present disclosure can adopt an existing radar array, for example, a coprime array composed of two sub-arrays, or an extended coprime array, etc.

S20, performing one-bit quantization on each echo data to obtain one-bit data of each radar node.

One-bit quantization is the conversion of echo data into one-bit information to reduce the amount of data, that is, the amount of one-bit data is smaller than the echo data, wherein the one-bit quantization process can be expressed as:

$$s_{one}(t) = \frac{1}{\sqrt{2}} [\text{sign}(\text{real}\{s_{IF}(t)\}) + j \cdot \text{sign}(\text{imag}\{s_{IF}(t)\})]$$

where $s_{one}(t)$ represents one-bit data, $s_{IF}(t)$ represents echo data, real{g} represents real part of a complex number, imag{g} represents imaginary part of a complex number, sign(·) represents a sign-taking operation, and t represents time domain sampling.

S30, estimating a distance information of the target relative to each radar node based on the one-bit data of each radar node, and estimating a direction of arrival of signal corresponding to each radar node based on the one-bit data of each radar node.

The frequency of the echo data $f_a$ includes the distance frequency and the Doppler frequency caused by the speed. The Doppler frequency $f_D$ caused by the speed is much smaller than the distance frequency $f_R$, and even smaller than the frequency resolution of the time domain sampling. Therefore, it is difficult to estimate the speed information from the fast time dimension. Therefore, we can obtain $f_R$ by performing a Fast Fourier Transform (FFT) on all sampling points to obtain the distance information of the target:

$$R = \frac{c f_R}{2\kappa}$$

Although the Doppler frequency $f_D$ caused by speed is very small, due to the small distance change between each pulse, it can be measured by the phase change between each pulse, that is, $f_D$ can be obtained by performing FFT between pulses, and inversely deducing the formula to obtain the speed information of the target:

$$v = \frac{\lambda f_D}{2}$$

Based on this, in one implementation, estimating the distance information of the target relative to each radar node based on the one-bit data of each radar node specifically includes:

Performing T-point fast Fourier transform in the fast time dimension of the one-bit data of each radar node to obtain the range frequency;

Calculating the distance information of the target relative to each radar node based on the distance frequency.

Performing T-point FFT in the fast time dimension $s_{one}(t)$ is:

$$S_{range}(f) = \sum_{t=1}^{T} s_{one}(t) e^{-i2\pi \frac{t}{T}}$$

where $S_{range}(f)$ represents fast Fourier transform in the fast time dimension, f represents the fast time dimension.

After performing T-point FFT in the fast time dimension, the distance frequency can be obtained, and then the distance information of the target relative to each radar node can be calculated based on the relationship between the distance frequency and the distance information.

In addition, after obtaining the one-bit data, the speed information can be determined by performing a P-point FFT in the slow time dimension, wherein the P-point FFT in the slow time dimension can be expressed as:

$$S_{doppler}(f, p) = \sum_{p=1}^{P} S_{range}(f, p) e^{-i2\pi \frac{p}{P}}$$

where $S_{doppler}(f, p)$ represents performing P-point fast Fourier transform in the slow time dimension, and p represents the slow time dimension.

The Doppler frequency $f_D$ caused by the velocity can be obtained by performing P-point FFT in the slow time dimension, and then the velocity information can be calculated based on the relationship between the velocity information and the Doppler frequency $f_D$ caused by the velocity.

Cell averaging CFAR (CA-CFAR) detection is performed on the velocity information. For the (i, j)-th cell to be detected, the reference cell set W around it is selected to calculate the energy average of the reference cell as the estimation of the clutter power:

$$C(i, j) = \frac{1}{N_{ref}} \sum_{(m,n) \in W} S_{doppler}(m, n)$$

where $N_{ref}$ is the number of reference cells, and (m, n) represents the reference cell coordinate.

Set $P_F$ as the false alarm rate, the threshold factor is expressed as:

$$\gamma = N_{ref}\left(P_F^{-\frac{1}{N_{ref}}} - 1\right)$$

The threshold value of the unit under test is:

$$T(i,j) = \gamma C(i,j)$$

All cells to be detected of $S_{doppler}$ are traversed, and the target detection is performed by comparing the size of the detected cell with the threshold T. According to the Neyman-Pearson criterion, when the amplitude of the detected cell is greater than the threshold, it means that the target exists in the detected cell, and the data of all array elements in the detected cell are extracted into a single snapshot spatial vector for subsequent DoA estimation.

In one implementation, the direction of arrival of signal estimation process may be:

Considering that there are K far-field incoherent sources reaching the array from different angles $\theta_1, \theta_2, \ldots, \theta_K$, the array receiving signal is modeled as:

$$y = Ax + n$$

where y represents the array received signal, $A=[a(\theta_1), a(\theta_2), \ldots, a(\theta_K)]$ represents the array manifold $a(\theta_k)=[1, e^{j2\pi p_1 \sin(\theta_k)/\lambda}, \ldots, e^{j2\pi p_{w-1} \sin(\theta_k)/\lambda}]$ represents the steering vector of the k-th information source, $\lambda$ represents the wavelength; $x=[x_1, x_2, \ldots, x_K]$ represents the signal amplitude vector; and n represents the white Gaussian noise vector.

The sample covariance matrix of T received signal of the snapshot array is:

$$\hat{R} = \frac{1}{T} y y^H = \hat{V}_s \hat{D}_s \hat{V}_s^H + \hat{V}_n \hat{D}_n \hat{V}_n^H,$$

where $\hat{D}_s$ represents a diagonal matrix, containing K main eigenvalues, while $\hat{D}_n$ contains the remaining eigenvalues. Accordingly, $\hat{V}_s$ and $\hat{V}_n$ are designated to represent the estimated signal subspace and noise subspace, respectively.

Of course, in practical applications, when the coprime array is the coprime array mentioned above, the covariance matrix of the coprime array under a single snapshot is:

$$\hat{R} = y y^H$$
$$= \left(\sum_{k=1}^{K} y_{\theta_k} + n\right)\left(\sum_{k=1}^{K} y_{\theta_k} + n\right)^H$$
$$= \sum_{k=1}^{K} y_{\theta_k} y_{\theta_k}^H + \left[\sum_{k=1}^{K}\sum_{\substack{r=1 \\ r \neq k}}^{K} y_{\theta_k} y_{\theta_r}^H + \sum_{k=1}^{K}\left(y_{\theta_k} n^H + n y_{\theta_k}^H\right)\right] + n n^H$$
$$= \hat{R}_s + \hat{R}_c + \hat{R}_n$$

$$\hat{R}_s = \sum_{k=1}^{K} y_{\theta_k} y_{\theta_k}^H$$

$$\hat{R}_c = \left[\sum_{k=1}^{K}\sum_{\substack{r=1 \\ r \neq k}}^{K} y_{\theta_k} y_{\theta_r}^H + \sum_{k=1}^{K}\left(y_{\theta_k} n^H + n y_{\theta_k}^H\right)\right]$$

$$\hat{R}_n = n n^H$$

Among them, $y^H$ represents the conjugate of y, $n^H$ represents the conjugate of n, $\hat{R}_s$ represents the signal autocorrelation matrix; $\hat{R}_c$ represents the sum of the cross-correlation matrix between different signals and the signal-noise cross-correlation matrix; $\hat{R}_n$ represents the noise autocorrelation matrix, $y_{\theta_k}$ represents the received signal of the k-th source, $y_{\theta_k}^H$ represents the conjugate of $y_{\theta_k}$, $p_i$ represents the array element spacing between the i-th array element and the starting array element, $i=1, 2, \ldots, W-1$.

When using IAA (Iterative Adaptive Approach) for DoA estimation, first assume that the interference matrix of the k-th source is:

$$Q_k = E\{(y - a(\theta_k)x_k)(y - a(\theta_k)x_k)^H\}$$
$$= y y^H - |x_k|^2 a(\theta_k) a(\theta_k)^H, k = 1, 2, \ldots, K$$

where, $E\{\bullet\}$ represents mathematical expectation.

Then, a weighted least squares cost function for $Q_k^{-1}$ is constructed:

$$\min_{x_k} \|y - a(\theta_k) x_k\|_{Q_k^{-1}}^2$$

$$\|\bullet\|_{Q_k^{-1}} = \bullet^H Q_k^{-1} \bullet$$

Again, the closed-form solution obtained by minimizing the least squares cost function is:

$$x_k = \frac{a^H(\theta_k) Q_k^{-1} y}{a^H(\theta_k) Q_k^{-1} a(\theta_k)}$$

Then the interference matrix of k-th source is substituted into the closed-form solution. According to the matrix inversion theorem, the closed-form solution can be simplified to:

$$x_k = \frac{a^H(\theta_k) \hat{R}^{-1} y}{a^H(\theta_k) \hat{R}^{-1} a(\theta_k)}$$

where $\hat{R}^{-1}$ represents the inverse matrix of the covariance matrix of the array received signal.

In order to obtain DoA estimation within a certain angle range, a complete steering vector matrix $\tilde{A}$ about the proposed array $\mathbb{P}$ is constructed. The steering vector matrix $\tilde{A}$ can be a diagonal matrix with the steering vector of the source as the diagonal element, that is, the steering vector matrix $\tilde{A}$ can be:

$$\tilde{A} = \begin{Bmatrix} a(\theta_1) & 0 & \ldots & 0 \\ 0 & a(\theta_2) & \ldots & 0 \\ \ldots & \ldots & \ldots & \ldots \\ 0 & 0 & \ldots & a(\theta_K) \end{Bmatrix}.$$

Then, the signal amplitude is estimated based on the steering vector matrix $\tilde{A}$. The relationship between the signal amplitude, covariance matrix and steering vector matrix is:

$$x = \frac{\tilde{A} R^{-1} y}{\tilde{A}^H R^{-1} \tilde{A}}$$

The covariance matrix is estimated from the power spectrum and the complete steering vector matrix:

$$\hat{R} = \tilde{A} \hat{P} \tilde{A}^H$$

Where, $\hat{P}$ represents the power spectrum, and is a diagonal matrix, and the main diagonal elements are composed of $|x|^2$. The initial power spectrum $\hat{P}^{(0)}$ of the received signal is estimated by CBF:

$$\hat{P}^{(0)} = \frac{|\tilde{A}^H y|^2}{\tilde{A}^H \tilde{A}}$$

Where, $\hat{P}^{(0)}$ represents the initial power spectrum and $\tilde{A}^H$ represents the conjugate of the steering vector matrix $\tilde{A}$.

In addition, after the signal amplitude is estimated, the covariance matrix is reconstructed based on the estimated signal amplitude, and then the signal amplitude is reconstructed based on the reconstructed covariance matrix to directly reach the last signal amplitude when the preset end condition is reached, wherein the end condition is preset, and can be a preset number threshold, or the difference between the signal amplitudes of two adjacent estimates is less than a preset difference threshold, etc. In the embodiment of the present disclosure, the end condition is that the difference between the signal amplitudes of two adjacent estimates is less than the preset difference threshold, that is, the end condition is:

$$\frac{\|x^{(t)} - x^{(t-1)}\|_2}{\|x^{(t)}\|_2} \le \varepsilon$$

where $x^{(t)}$ represents the signal amplitude of the t-th estimation, $x^{(t-1)}$ represents the signal amplitude of (t−1)-th estimation, and $\varepsilon$ represents the preset error threshold.

Exemplarily, the process of estimating the direction of arrival of signal may be as shown in Table 1.

Table 1 Single Snapshot DoA Estimation Process Algorithm Steps

1. Estimating the initial power $P^{(0)}$ of the array received signal y through the least squares cost function;
2. Constructing the covariance matrix $\hat{R}$ using the estimated power;
3. Using the covariance matrix to obtain an estimate of the signal amplitude $\hat{x}$ corresponding to the complete set $\tilde{A}$;
4. Repeating steps 2 and 3 until $$\frac{\|x^{(t)} - x^{(t-1)}\|_2}{\|x^{(t)}\|_2} \le \varepsilon$$

5. Performing a peak search on the power spectrum $|x^{(t)}|^2$ to complete the DoA estimation.

S40: Determining, based on the distance information of the target relative to each radar node and the direction of arrival of signal corresponding to each radar node, a position information of the target relative to each radar node.

The location information is the location coordinates of the target in the coordinate system where the radar node is located. After obtaining the distance information and the direction of arrival of signal, the location of the radar node is used as the coordinate origin, and the location information of the target relative to each radar node can be calculated.

S50: Fussing the position information of the target relative to each radar node to obtain a tracking point of the target, and forming a tracking trajectory of the target based on the tracking point.

The position information of the tracking point is obtained by fussing the position information of each radar node, and the coordinate system of the tracking point can be the coordinate system of a radar node among multiple radar nodes, or a tracking coordinate system different from the coordinate system of each radar node. In the embodiment of the present disclosure, the coordinate system of a target radar node among multiple radar nodes is used as the coordinate system of the tracking point, that is, the position information corresponding to each radar node except the target radar node among the multiple radar nodes can be converted to the coordinate system of the target radar node, and then the position information of all radar nodes in the coordinate system of the target radar node is fussed to obtain the coordinate information of the tracking point.

Exemplarily, fussing the position information of the target relative to each radar node to obtain the tracking point of the target includes:

Selecting, in the multi-radar node system, a radar node as a target radar node, and adopting a coordinate system of the selected target radar node as a target coordinate system;

Converting the position information of the target relative to other radar nodes into the target coordinate system to obtain a converted position information of the target relative to other radar nodes;

Fussing the position information of the target relative to the target radar node and the converted position information of the target relative to other radar nodes to obtain the tracking point of the target.

The target radar node can be any one of the radar nodes in the multi-radar node system. After the target radar node is acquired, the position information corresponding to the other radar nodes is converted to the target coordinate system. For example, the radar nodes in the multi-radar node system include a left radar node and a right radar node. The horizontal displacement of the right radar node relative to the left radar node is $(\Delta x, \Delta y)$, and the deflection angle of the right radar node relative to the left radar node is $\Delta\theta$. With the left radar node and the right radar node as the coordinate origin, the point cloud polar coordinates of the left radar node and the point cloud polar coordinates of the right radar node are respectively expressed as:

$$\begin{cases} x_L = R_L\sin(\theta_L) \\ y_L = R_L\cos(\theta_L) \end{cases}$$
$$\begin{cases} x_R = R_R\sin(\theta_R) \\ y_R = R_R\cos(\theta_R) \end{cases}$$

where $R_L$ represents the distance information of the target relative to the left radar node, $\theta_L$ represents the direction of arrival of signal of the target relative to the left radar node, $R_R$ represents the distance information of the target relative to the left radar node, $\theta_R$ represents the direction of arrival of signal of the target relative to the left radar node, $x_L$ represents the coordinates of the direction x, $y_L$ represents the coordinates of the direction y, and $x_R$ represents the coordinates of the direction x, and $y_R$ represents the coordinates of the direction y.

Then, when the coordinate system of the left radar node is used as the target coordinate system, the converted position information obtained after converting the position information corresponding to the right radar node to the target coordinate system can be:

$$\begin{cases} x'_R = (x_R + \Delta x)\cos\Delta\theta - (y_R + \Delta y)\sin\Delta\theta \\ y'_R = (x_R + \Delta x)\sin\Delta\theta + (y_R + \Delta y)\cos\Delta\theta \end{cases}$$

where $x_R'$ represents the transformed coordinate of the direction x, and $y_R$ represents the transformed coordinate of the direction y.

Further, when the position information of the target relative to the target coordinate radar and the conversion position information of the target for each of the remaining radar nodes are fused, it can be done in a weighted manner, or it can be done in an average manner, or it can be done by randomly selecting one, etc. In the embodiment of the present disclosure, the average value method is used for fusion. For example, after the conversion position information corresponding to the right radar node and the position information of the left radar node in the above example, the average value of the conversion position information corresponding to the right radar node and the position information of the left radar node is calculated to obtain the position information of the tracking point of the target, where the position information of the tracking point of the target is:

$$\begin{cases} \overline{x} = \dfrac{x_R' + x_L}{2} \\ \overline{y} = \dfrac{y_R' + y_L}{2} \end{cases}$$

where $\overline{x}$ represents the rear coordinate of the direction x of the tracking point, and $\overline{y}$ represents the rear coordinate of the direction y of the tracking point.

Furthermore, after obtaining the tracking point, speed information can be marked on the tracking point. That is, the method further includes:

Performing a P-point fast Fourier transform in a slow time dimension of the one-bit data of each radar node to obtain a velocity frequency;

Calculating a speed information of the target relative to each radar node based on the speed frequency;

Fussing the speed information of each radar node to obtain speed information corresponding to the tracking point, and recording the speed information on the tracking point.

The process of determining the speed information can refer to the above description. At the same time, the fusion of the speed information can be the same as the fusion of the position information, both using the average value method, or the fusion method of the speed information can be different from the fusion method of the position information, such as the speed information using a random selection method and the position information using a weighted method. In the embodiment of the present disclosure, the fusion method of the speed information and the fusion method of the position information both use the average value method.

Furthermore, in order to effectively monitor and track the target ship using the one-bit quantization based target tracking method provided in the embodiment of the present disclosure, an embodiment is given here.

In the present embodiment, a dual-base radar system consisting of two TI AWR2944s was deployed on the shore. The horizontal interval between the two radar nodes in the dual-base radar system was set to 7 meters, and the target ship's motion range was set to 5 to 50 meters from the shore. Both radar nodes used linear frequency modulated continuous wave (LFMCW) signals with a bandwidth of 384 MHz, a carrier frequency of 77 GHz, and a 12-channel array. The data was sampled through a 16-bit analog-to-digital converter (ADC), and one-bit data was extracted by retaining the first bit of each sampling point. In the above cases, experiments were conducted by turning on only the left radar node and turning on both the left radar node and the right radar node at the same time. Further includes:

(1) Placing an unmanned ship (i.e., the target ship) on the lake surface and controlling the unmanned ship by wireless signals to navigate along a predetermined track.

Figure 4:
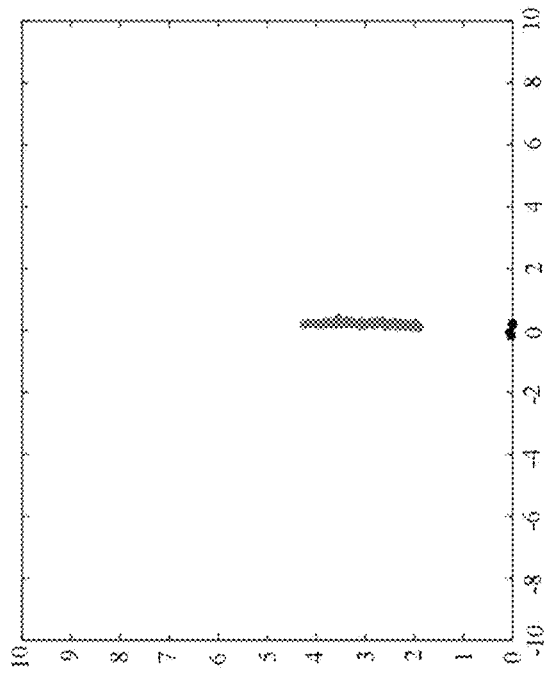
FIG. 4 is a comparison of a single-base radar track 1 (multi-bit on the left and one-bit on the right).
Figure 4:
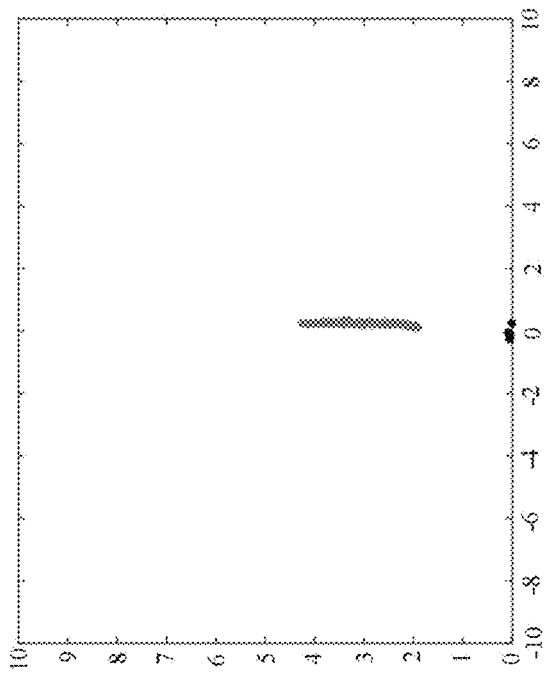
Figure 5:
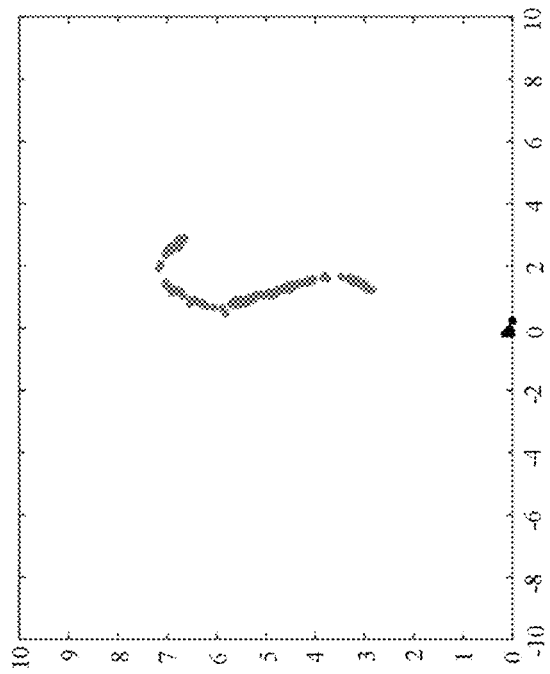
FIG. 5 is a comparison of a single-base radar track 2 (multi-bit on the left and one-bit on the right).
Figure 5:
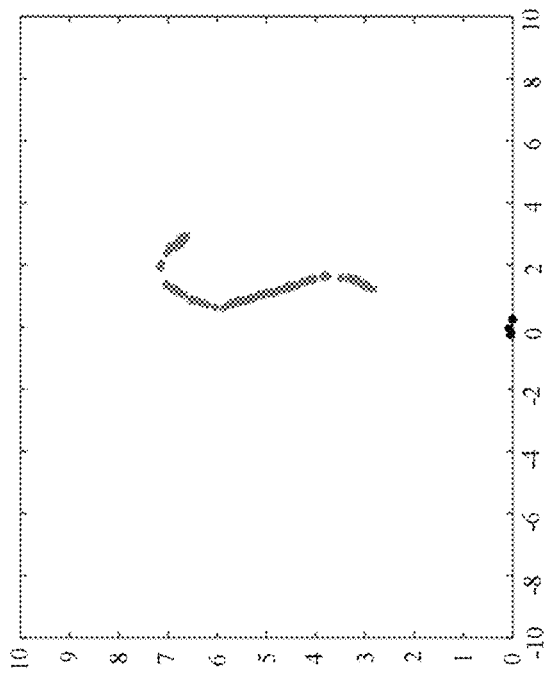
Figure 6:
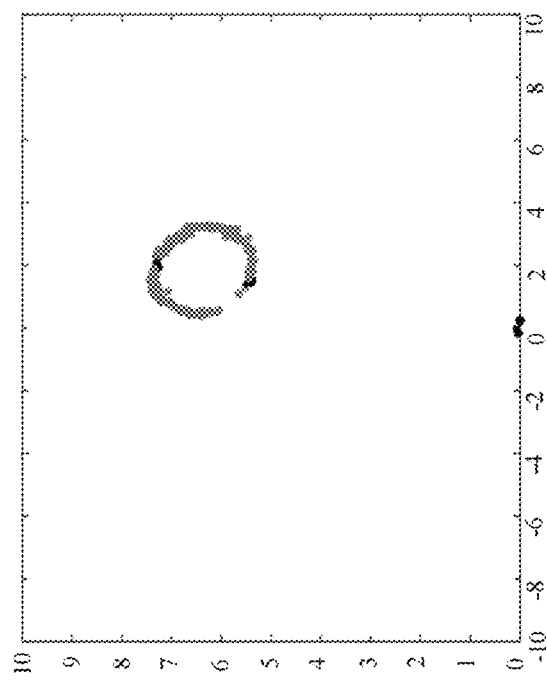
FIG. 6 is a comparison of a single-base radar track 3 (multi-bit on the left and one-bit on the right).
Figure 6:
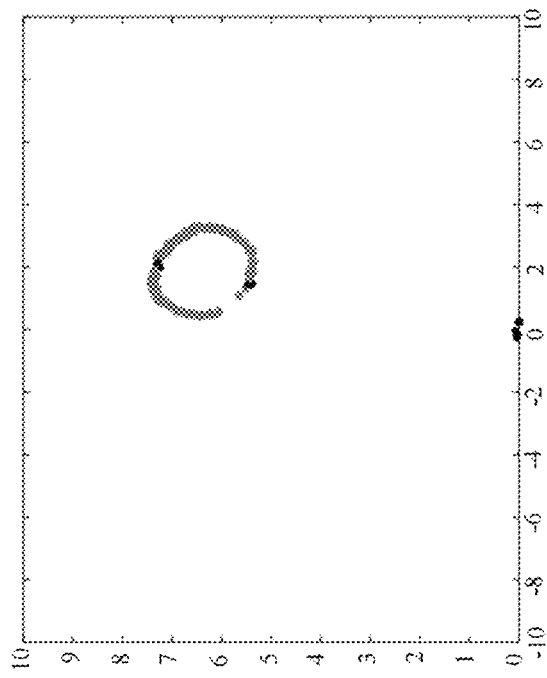
Figure 7:
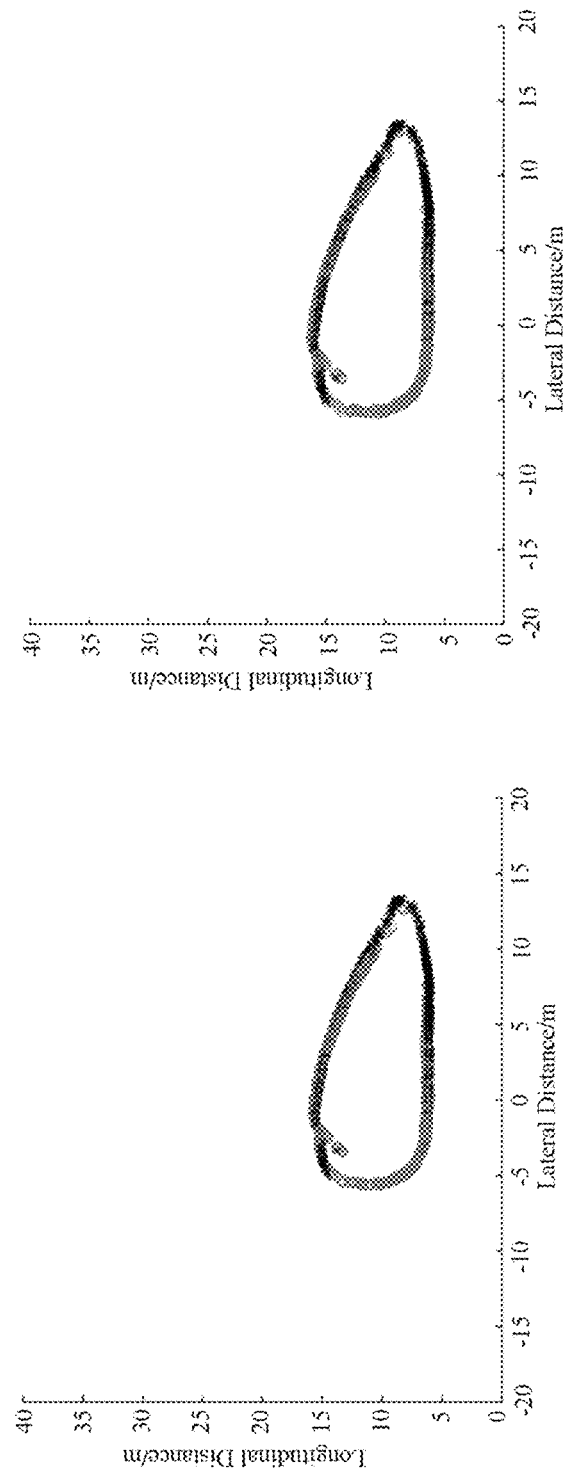
FIG. 7 is a comparison of a bistatic radar track 1 (multi-bit on the left and one-bit on the right).

(2) Turning on only the left radar system for three experiments, and turning on the both radar systems at the same time for one experiment. In each experiment, high-bit echo data was collected and one-bit quantization was performed to form one-bit data. The one-bit and high-bit radar positioning algorithms were respectively run to form the track diagram of the unmanned ship. Among them, the comparison diagram of the single-base track 1 is shown in FIG. 4, the comparison diagram of the single-base track 2 is shown in FIG. 5, the comparison diagram of the single-base track 3 is shown in FIG. 6, and the comparison diagram of the dual-base track 1 is shown in FIG. 7;

(3) Calculating the relative angle difference and position difference between the one-bit positioning algorithm and the multi-bit positioning algorithm in each experiment to obtain the experimental results shown in Table 2, where the calculation formulas for the angle error and position error are:

$$\text{Angular Error} = \sum_{i=1}^{N} \frac{1}{N} |\theta_1[i] - \theta_{16}[i]|$$

$$\text{Position error} = \sum_{i=1}^{N} \frac{1}{N} \sqrt{(x_1[i] - x_{16}[i])^2 + (y_1[i] - y_{16}[i])^2}$$

TABLE 2

Experimental results (single bit vs. 16 bit):

| Serial number | Test items | Angular error (degrees) | Position error (meters) |
|---|---|---|---|
| 1 | single-base radar track 1 | 0.3722 | 0.0363 |
| 2 | single-base radar track 2 | 0.3049 | 0.0369 |
| 3 | single-base radar track 3 | 0.3410 | 0.0323 |
| 4 | bistatic radar track 1 | 0.3527 | 0.0361 |

In addition, through the track fusion of the bistatic radar, the detection range and track reliability of target ships are improved, and the detection range is increased by about ⅔.

Figure 8:
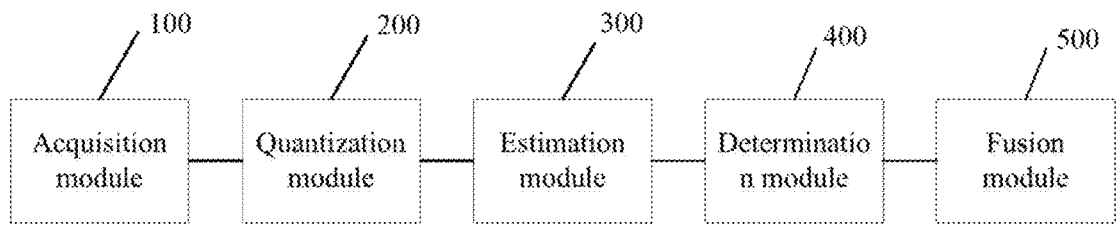
FIG. 8 is a principal block diagram of a one-bit quantization based target tracking device according to an embodiment of the present disclosure.

Based on the above-mentioned one-bit quantization based target tracking method, the present embodiment provides a one-bit quantization based target tracking device, as shown in FIG. 8, the one-bit quantization based target tracking device includes:

An acquisition module 100, used to acquire echo data of each radar node in a multi-radar node system for a target;

The quantization module 200, used to perform one-bit quantization on each echo data separately to obtain one-bit data of each radar node;

An estimation module 300, used to estimate a distance information of the target relative to each radar node based on the one-bit data of each radar node, and estimate a direction of arrival of signal corresponding to each radar node based on the one-bit data of each radar node;

A determination module 400, used to determine, based on the distance information of the target relative to each radar node and the direction of arrival of signal corresponding to each radar node, a position information of the target relative to each radar node;

A fusion module 500, used to fuss the position information of the target relative to each radar node to obtain a tracking point of the target, and form a tracking trajectory of the target based on the tracking point.

Based on the above-mentioned one-bit quantization based target tracking method, the present embodiment provides a computer-readable storage medium, which stores one or more programs. The one or more programs can be executed by one or more processors to implement the steps in the one-bit quantization based target tracking method as described in the above-mentioned embodiments.

Figure 9:
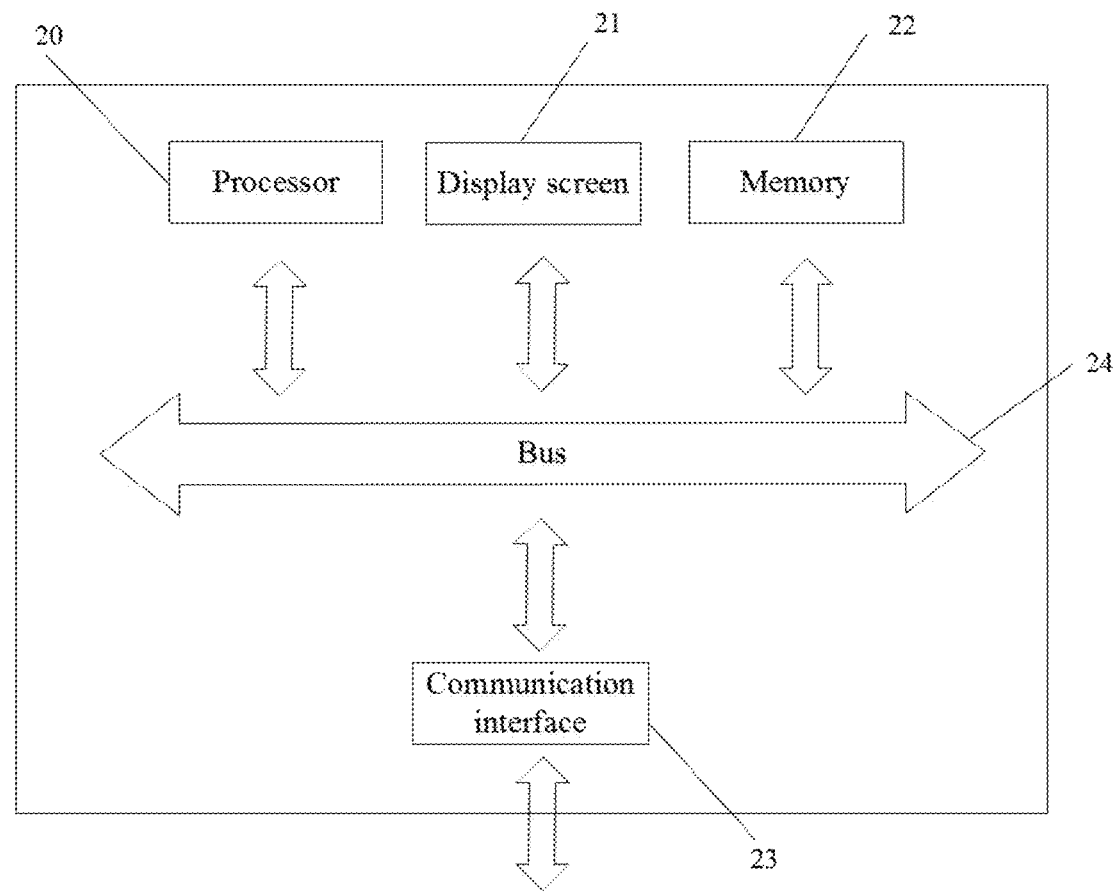
FIG. 9 is a functional block diagram of a terminal according to an embodiment of the present disclosure.

Based on the above-mentioned one-bit quantization based target tracking method, the present disclosure also provides a terminal, as shown in FIG. 9, which includes at least one processor 20; a display screen 21; and a memory 22, and may also include a communication interface 23 and a bus 24. Among them, the processor 20, the display screen 21, the memory 22 and the communication interface 23 can communicate with each other through the bus 24. The display screen 21 is configured to display a preset user guide interface in the initial setting mode. The communication interface 23 can transmit information. The processor 20 can call the logic instructions in the memory 22 to execute the method in the above-mentioned embodiment.

In addition, the logic instructions in the memory 22 can be implemented in the form of software functional units and can be stored in a computer-readable storage medium when sold or used as an independent product.

The memory 22 is a computer-readable storage medium that can be configured to store software programs, computer executable programs, such as program instructions or modules corresponding to the methods in the embodiments of the present disclosure. The processor 20 executes functional applications and data processing by running the software programs, instructions or modules stored in the memory 22, that is, implementing the methods in the above embodiments.

The memory 22 may include a program storage area and a data storage area, wherein the program storage area may store an operating system and at least one application required for a function; the data storage area may store data created according to the use of the terminal. In addition, the memory 22 may include a high-speed random access memory and may also include a non-transitory memory. For example, a variety of media that can store program codes, such as a USB flash drive, a mobile hard disk, a read-only memory (ROM), a random access memory (RAM), a disk or an optical disk, may also be a transient storage medium.

In addition, the process of how the instructions in the storage medium or terminal are loaded and executed by the processor has been described in detail in the above-mentioned method, and will not be described one by one here.

Finally, it should be noted that the above embodiments are only used to illustrate the technical solutions of the present disclosure, rather than to limit it. Although the present disclosure has been described in detail with reference to the aforementioned embodiments, those skilled in the art should understand that they can still modify the technical solutions described in the aforementioned embodiments, or make equivalent replacements for some of the technical features therein. However, these modifications or replacements do not deviate the essence of the corresponding technical solutions from the spirit and scope of the technical solutions of the embodiments of the present disclosure.

What is claimed is:

1. A one-bit quantization based target tracking method, comprising:

acquiring echo data of each radar node in a multi-radar node system for a target;

performing one-bit quantization on each echo data separately to obtain one-bit data of each radar node;

estimating a distance information of the target relative to each radar node based on the one-bit data of each radar node, and estimating a direction of arrival of signal corresponding to each radar node based on the one-bit data of each radar node;

determining, based on the distance information of the target relative to each radar node and the direction of arrival of signal corresponding to each radar node, a position information of the target relative to each radar node; and fussing the position information of the target relative to each radar node to obtain a tracking point of the target, and forming a tracking trajectory of the target based on the tracking point.

2. The one-bit quantization based target tracking method according to claim 1, wherein the each radar node in the multi-radar node system are arranged at intervals, and two adjacent radar nodes are separated in geographical locations.

3. The one-bit quantization based target tracking method according to claim 1, wherein the one-bit quantization is:

$$s_{one}(t) = \frac{1}{\sqrt{2}}[\text{sign}(\text{real}\{s_{IF}(t)\}) + j \cdot \text{sign}(imag\{s_{IF}(t)\})]$$

$$s_{IF}(t) = A_0 \exp\{i 2\pi f_a t + \varphi_1\}$$

$$\text{sign}(g) = \begin{cases} 1, & \geq 0 \\ -1, & < 0 \end{cases}$$

$$f_a = \frac{2R\kappa}{c} + \frac{2v}{\lambda} = f_R + f_D$$

$$\kappa = B/T$$

$$\lambda = 1/f_c$$

$$\phi_1 = \frac{4\pi R}{\lambda} \mod (2\pi)$$

where $s_{one}(t)$ represents one-bit data, $s_{IF}(t)$ represents echo data, real{g} represents real part of a complex number, imag{g} represents imaginary part of a complex number, sign(·) represents sign-taking operation, $A_0$ represents signal amplitude, $\varphi_1$ represents phase of the echo data, $f_a$ represents frequency of the echo data, t represents time domain sampling, $i=\sqrt{-1}$, κ represents frequency modulation slope, B signal frequency modulation bandwidth, T represents signal frequency modulation period, c represents speed of light, $f_c$ represents carrier frequency, A represents carrier wavelength, mod(·) represents integer-taking operation, R represents distance information, v represents speed information, $f_D$ represents speed frequency, and $f_R$ represents distance frequency.

4. The one-bit quantization based target tracking method according to claim 1, wherein the estimating a distance information of the target relative to each radar node based on the one-bit data of each radar node comprises:

performing T-point fast Fourier transform in a fast time dimension of the one-bit data of each radar node to obtain a distance frequency; and calculating the distance information of the target relative to each radar node based on the distance frequency.

5. The one-bit quantization based target tracking method according to claim 1, wherein the fussing the position information of the target relative to each radar node to obtain a tracking point of the target comprises:

selecting, in the multi-radar node system, a radar node as a target radar node, and adopting a coordinate system of the selected target radar node as a target coordinate system;

converting the position information of the target relative to other radar nodes into the target coordinate system to obtain a converted position information of the target relative to other radar nodes; and fussing the position information of the target relative to the target radar node and the converted position information of the target relative to other radar nodes to obtain the tracking point of the target.

6. The one-bit quantization based target tracking method according to claim 1, wherein at least one radar node in the multi-radar node system is equipped with a coprime array, and the coprime array comprises a first subarray, a second subarray and a third subarray arranged in sequence on a straight line; the first subarray comprises N array elements, and has array element intervals of Ld; the second subarray comprises $$M^* = \left\lfloor \frac{LN}{M} \right\rfloor + 1$$

array elements, and has array element intervals of Md; the third subarray comprises L array elements, and has array element intervals of Nd; the first subarray overlaps with adjacent array elements of the second subarray, and the second subarray overlaps with adjacent array elements of the third subarray, while N, M and L are mutually prime.

7. The one-bit quantization based target tracking method according to claim 1, further comprising:

performing P-point fast Fourier transform in a slow time dimension of the one-bit data of each radar node to obtain a velocity frequency;

calculating a speed information of the target relative to each radar node based on the speed frequency; and fussing the speed information of each radar node to obtain speed information corresponding to the tracking point, and recording the speed information on the tracking point.

8. A one-bit quantization based target tracking device, comprising:

an acquisition module, configured to acquire echo data of each radar node in a multi-radar node system for a target;

a quantization module, configured to perform one-bit quantization on each echo data separately to obtain one-bit data of each radar node;

an estimation module, configured to estimate a distance information of the target relative to each radar node based on the one-bit data of each radar node, and estimate a direction of arrival of signal corresponding to each radar node based on the one-bit data of each radar node;

a determination module, configured to determine, based on the distance information of the target relative to each radar node and the direction of arrival of signal corresponding to each radar node, a position information of the target relative to each radar node; and a fusion module, configured to fuss the position information of the target relative to each radar node to obtain a tracking point of the target, and form a tracking trajectory of the target based on the tracking point.

9. A terminal, comprising: a processor and a memory, the memory stores a computer-readable program executable by the processor; and when the processor executes the computer-readable program, the steps of the one-bit quantization based target tracking method according to claim 1 are implemented.

\* \* \* \* \*